US012578185B2

(12) United States Patent
Yang et al.

(10) Patent No.: US 12,578,185 B2
(45) Date of Patent: Mar. 17, 2026

(54) ALIGNMENT DEVICE

(71) Applicant: Quanta Computer Inc., Taoyuan (TW)

(72) Inventors: Wen-Chu Yang, Taoyuan (TW);
Feng-Wei Chang, Taoyuan (TW)

(73) Assignee: QUANTA COMPUTER INC.,
Taoyuan City (TW)

( * ) Notice: Subject to any disclaimer, the term of this
patent is extended or adjusted under 35
U.S.C. 154(b) by 120 days.

(21) Appl. No.: 18/762,252

(22) Filed: Jul. 2, 2024

(65) Prior Publication Data

US 2025/0314483 A1        Oct. 9, 2025

(30) Foreign Application Priority Data

Apr. 9, 2024    (TW) ................................. 113113080

(51) Int. Cl.
G01B 11/27            (2006.01)
(52) U.S. Cl.
CPC .................................. G01B 11/272 (2013.01)
(58) Field of Classification Search
CPC .................................................... G01B 11/272
See application file for complete search history.

(56) References Cited

U.S. PATENT DOCUMENTS 10,670,808 B1      6/2020   Trail

FOREIGN PATENT DOCUMENTS

| CN | 120668356 | A | * | 9/2025 | |
| KR | 102610835 | B1 | * | 12/2023 | ........... G02B 3/0031 |

OTHER PUBLICATIONS

Chinese language office action dated Jan, 21, 2026, issued in
application No. TW 113113080.

* cited by examiner

*Primary Examiner* — Peter B Kim
(74) *Attorney, Agent, or Firm* — McClure, Qualey &
Rodack, LLP

(57)            ABSTRACT

An alignment device includes a carrying device, a sensing
device, a first adjustment device and a second adjustment
device. The carrying device places a dummy lens or an
optical waveguide lens. The dummy lens is provided with
characteristic points forming a first pattern. The sensing
device senses the first pattern to generate a first sensing
result. The sensing device senses a second pattern generated
by the light exit portion of the optical waveguide lens to
generate a second sensing result. The first adjustment device
adjusts the position of the sensing device or the carrying
device to align the dummy lens with the sensing device
according to the first sensing result. The second adjustment
device mounts a projector disposed adjacent to a light
entrance portion of the optical waveguide lens. The second
adjustment device adjusts the position of the projector to
align the optical waveguide lens with the projector.

10 Claims, 7 Drawing Sheets

100

100

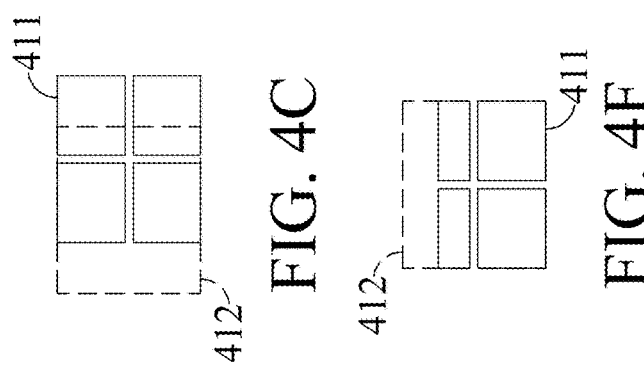
FIG. 4C
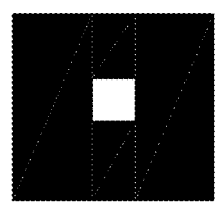
FIG. 4F
FIG. 4H
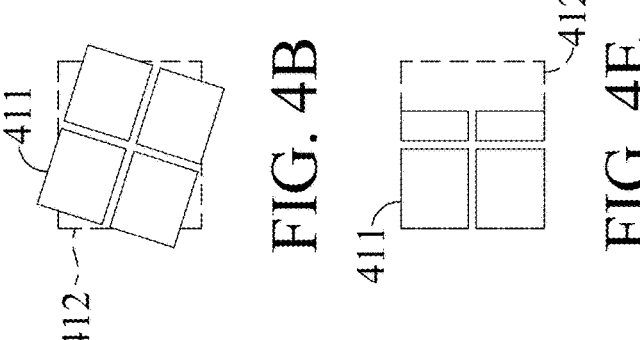
FIG. 4B
FIG. 4E
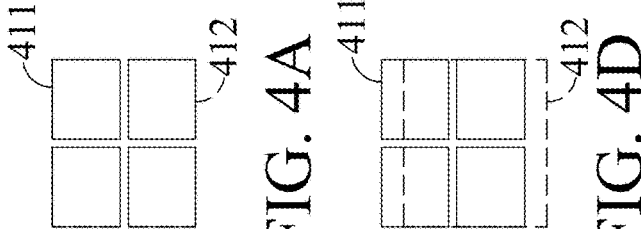
FIG. 4A
FIG. 4D
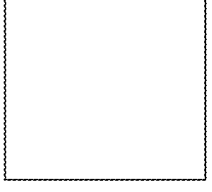
FIG. 4G

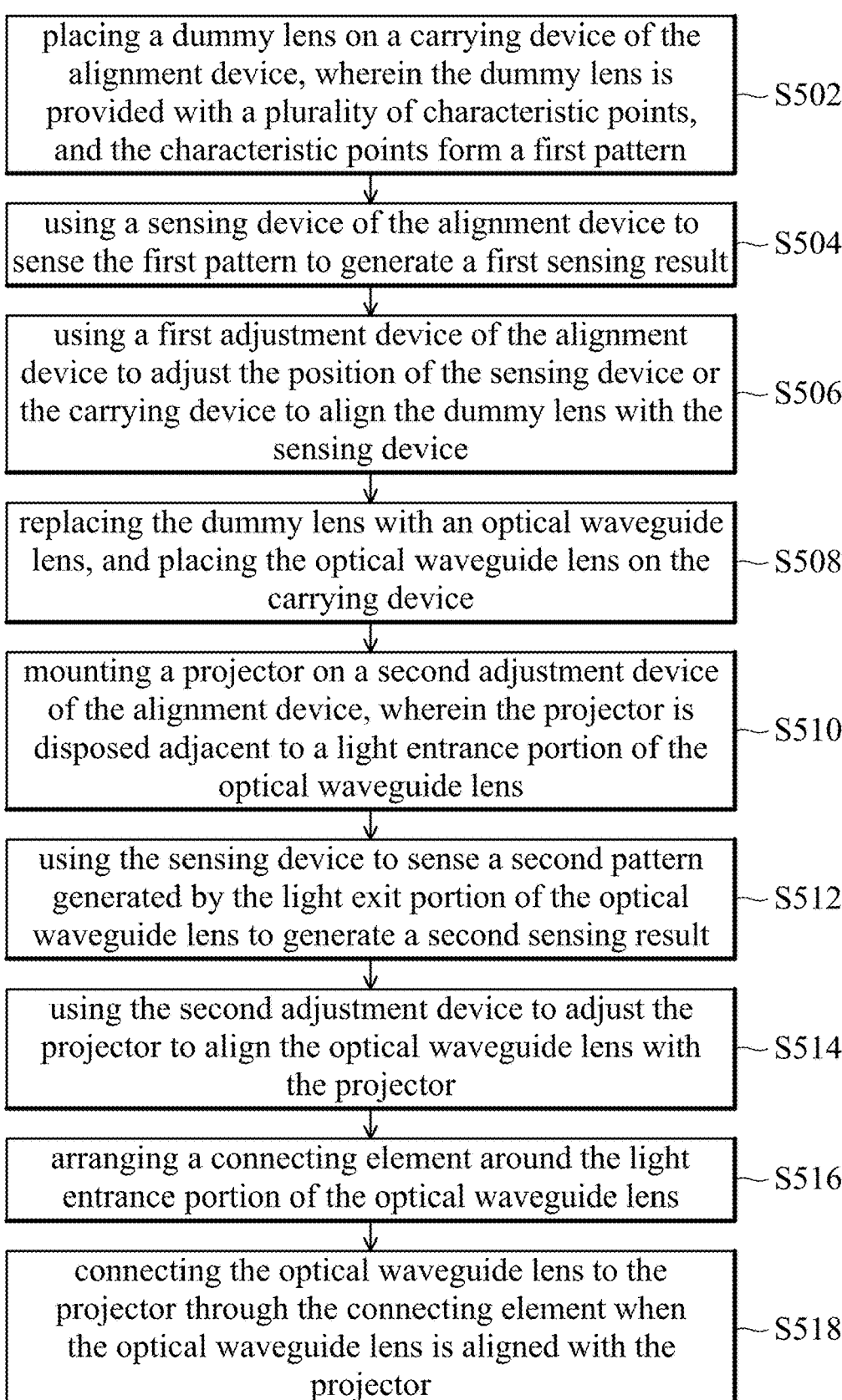

placing a dummy lens on a carrying device of the alignment device, wherein the dummy lens is provided with a plurality of characteristic points, and the characteristic points form a first pattern — S502 using a sensing device of the alignment device to sense the first pattern to generate a first sensing result — S504 using a first adjustment device of the alignment device to adjust the position of the sensing device or the carrying device to align the dummy lens with the sensing device — S506 replacing the dummy lens with an optical waveguide lens, and placing the optical waveguide lens on the carrying device — S508 mounting a projector on a second adjustment device of the alignment device, wherein the projector is disposed adjacent to a light entrance portion of the optical waveguide lens — S510 using the sensing device to sense a second pattern generated by the light exit portion of the optical waveguide lens to generate a second sensing result — S512 using the second adjustment device to adjust the projector to align the optical waveguide lens with the projector — S514 arranging a connecting element around the light entrance portion of the optical waveguide lens — S516 connecting the optical waveguide lens to the projector through the connecting element when the optical waveguide lens is aligned with the projector — S518

FIG. 5

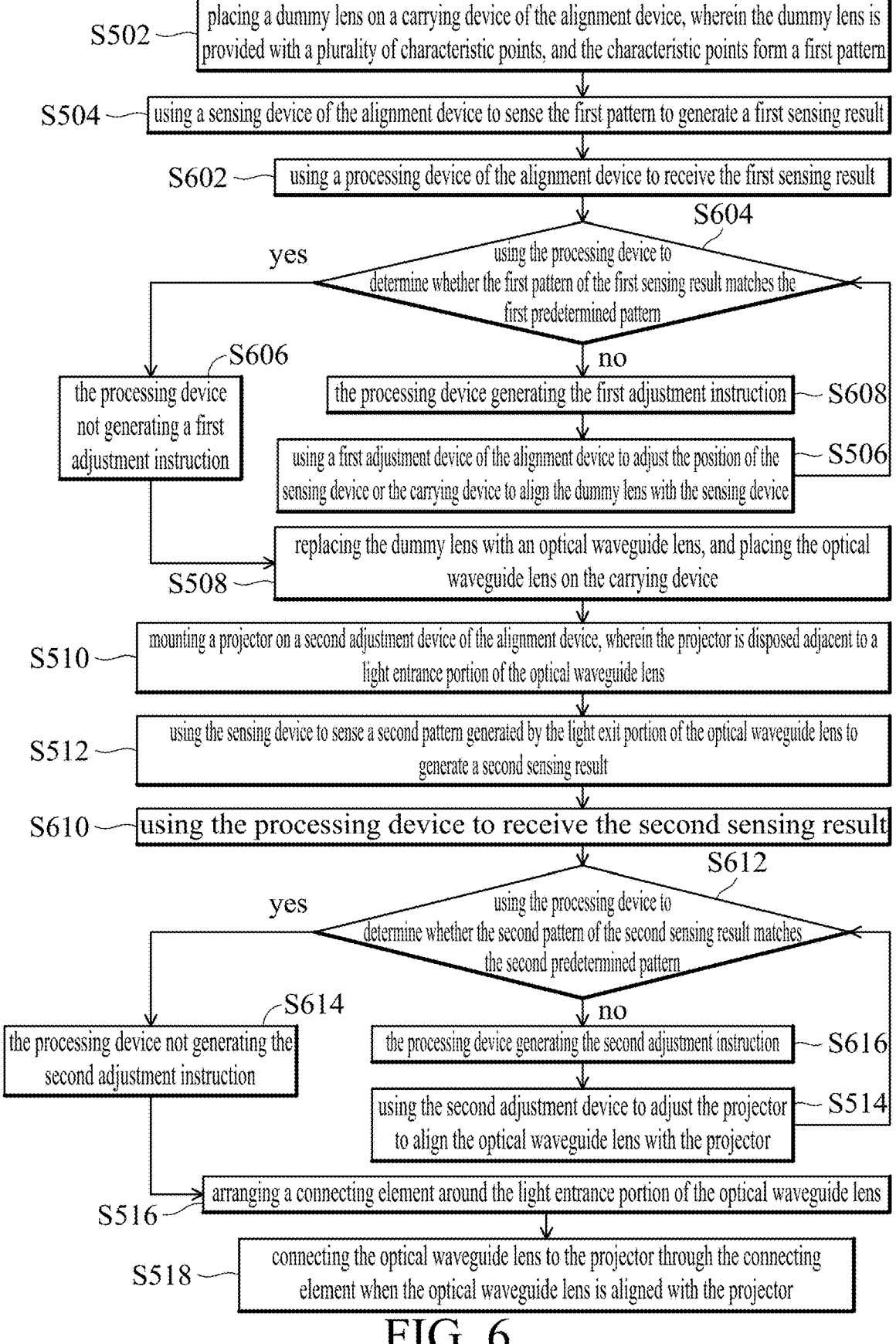

S502 — placing a dummy lens on a carrying device of the alignment device, wherein the dummy lens is provided with a plurality of characteristic points, and the characteristic points form a first pattern S504 — using a sensing device of the alignment device to sense the first pattern to generate a first sensing result S602 — using a processing device of the alignment device to receive the first sensing result S604 — using the processing device to determine whether the first pattern of the first sensing result matches the first predetermined pattern yes no S606 — the processing device not generating a first adjustment instruction S608 — the processing device generating the first adjustment instruction S506 — using a first adjustment device of the alignment device to adjust the position of the sensing device or the carrying device to align the dummy lens with the sensing device S508 — replacing the dummy lens with an optical waveguide lens, and placing the optical waveguide lens on the carrying device S510 — mounting a projector on a second adjustment device of the alignment device, wherein the projector is disposed adjacent to a light entrance portion of the optical waveguide lens S512 — using the sensing device to sense a second pattern generated by the light exit portion of the optical waveguide lens to generate a second sensing result S610 — using the processing device to receive the second sensing result S612 — using the processing device to determine whether the second pattern of the second sensing result matches the second predetermined pattern yes no S614 — the processing device not generating the second adjustment instruction S616 — the processing device generating the second adjustment instruction S514 — using the second adjustment device to adjust the projector to align the optical waveguide lens with the projector S516 — arranging a connecting element around the light entrance portion of the optical waveguide lens S518 — connecting the optical waveguide lens to the projector through the connecting element when the optical waveguide lens is aligned with the projector

FIG. 6

ALIGNMENT DEVICE

CROSS REFERENCE TO RELATED APPLICATIONS

This application claims priority of Taiwan Patent Application No. 113113080, filed on Apr. 9, 2024, the entirety of which is incorporated by reference herein.

BACKGROUND OF THE INVENTION

Field of the Invention

The present invention relates to an alignment device, and in particular it relates to an alignment device suitable for aligning an optical waveguide lens and a projector.

Description of the Related Art

In general, an optical waveguide display module includes an optical waveguide lens and a projector, and is used to transmit an image projected by the projector through the optical waveguide lens to output a display image, so as to project the display image output by the optical waveguide lens to the eye of the user. Therefore, the alignment of the optical waveguide lens and the projector is crucial.

However, if the optical waveguide lens and the projector are not in alignment, the display image output by the optical lens may be incomplete or skewed, thereby affecting the image quality and user experience. Therefore, how to effectively ensure the accuracy of the alignment of the optical waveguide lens and the projector has become a focus for technical improvements by various manufacturers.

BRIEF SUMMARY OF THE INVENTION

An embodiment of the present invention provides an alignment device, thereby effectively ensuring the accuracy of the alignment of the optical waveguide lens and the projector, so as to increase the image quality and the user experience.

An embodiment of the present invention provides an alignment device, which includes a carrying device, a sensing device, a first adjustment device and a second adjustment device. The carrying device is suitable for placing a dummy lens or an optical waveguide lens. The dummy lens is provided with a plurality of characteristic points, and the characteristic points form a first pattern. The sensing device is disposed relative to the carrying device. The sensing device is suitable for sensing the first pattern to generate a first sensing result. The sensing device is suitable for sensing a second pattern generated by the light exit portion of the optical waveguide lens to generate a second sensing result. The first adjustment device is configured to adjust the position of the sensing device or the carrying device to align the dummy lens with the sensing device according to the first sensing result. The second adjustment device is suitable for mounting a projector. The projector is disposed adjacent to a light entrance portion of the optical waveguide lens. The second adjustment device is configured to adjust the position of the projector to align the optical waveguide lens with the projector according to the second sensing result.

Therefore, it may effectively ensure the accuracy of the alignment of the optical waveguide lens and the projector, so as to increase the image quality and the user experience.

BRIEF DESCRIPTION OF THE DRAWINGS

The present invention can be more fully understood by reading the subsequent detailed description and examples with references made to the accompanying drawings, wherein:

FIG. 4A~FIG. 4F are schematic views of the corresponding relationship of the second pattern and the second predetermined pattern according to an embodiment of the present invention;

FIG. 4G and FIG. 4H are schematic views of a second pattern according to an embodiment of the present invention;

FIG. 5 is a flowchart of an operation method of an alignment device according to an embodiment of the present invention;

FIG. 6 is a flowchart of an operation method of an alignment device according to another embodiment of the present invention;

DETAILED DESCRIPTION OF THE INVENTION

In each of the following embodiments, the same reference number represents an element or component that is the same or similar.

Figure 1:
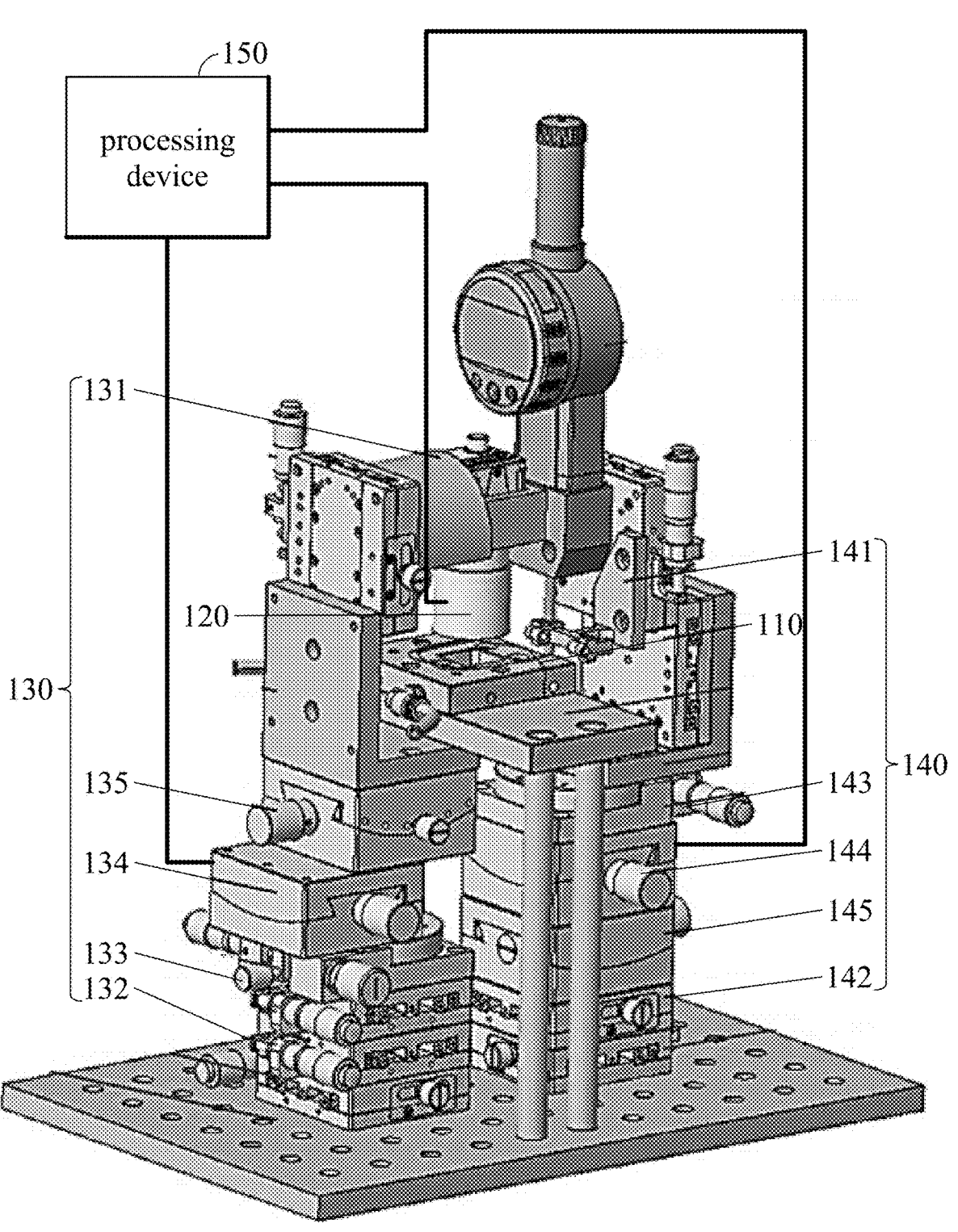
FIG. 1 is a schematic view of an alignment device according to an embodiment of the present invention.

FIG. 1 is a schematic view of an alignment device according to an embodiment of the present invention. Please refer to FIG. 1. The alignment device 100 may include a carrying device 110, a sensing device 120, a first adjustment device 130 and a second adjustment device 140.

Figures 2A, 2B, 3A, 3B, 3C, 3D, 3E, 3F:
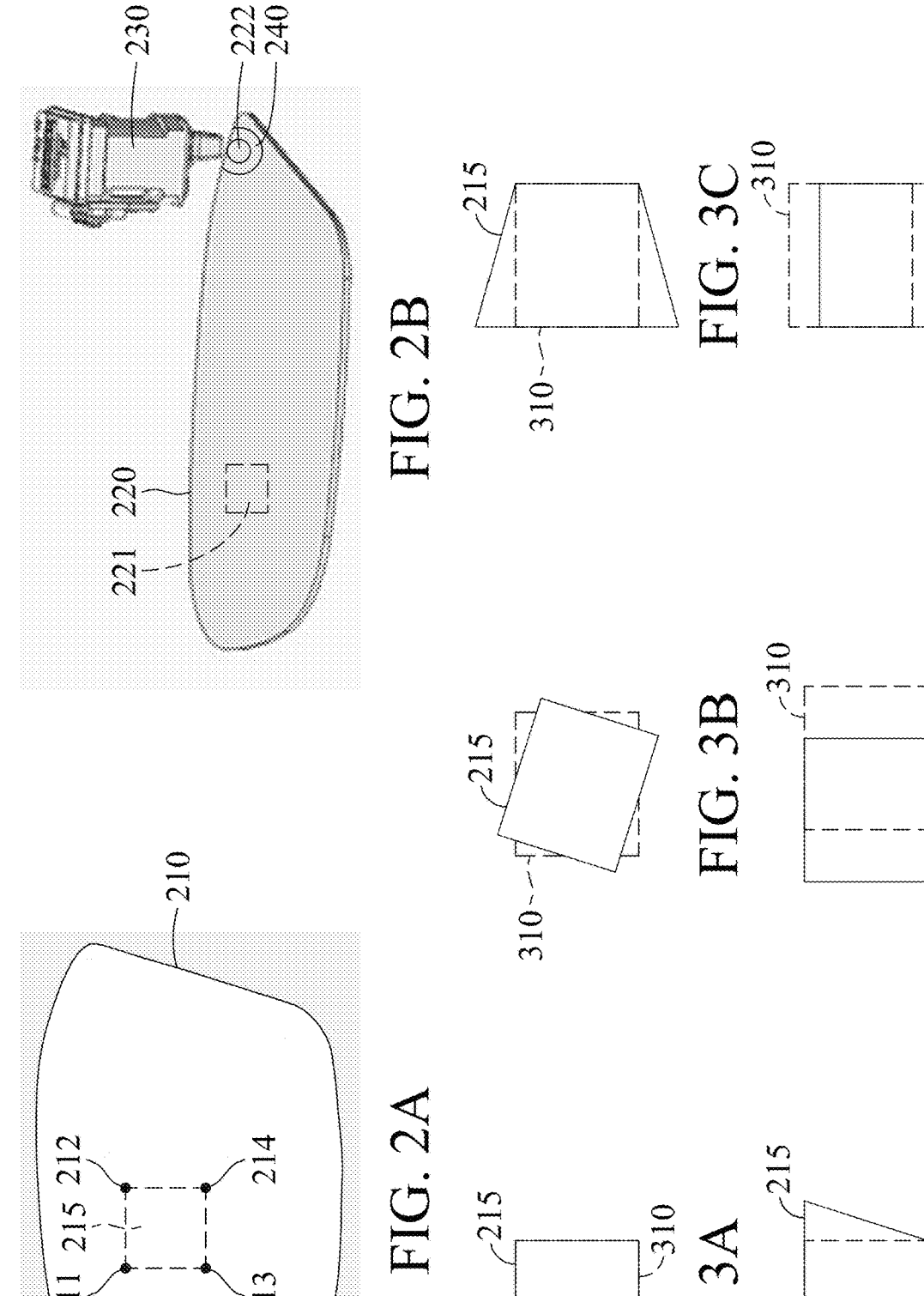
FIG. 2A is a schematic view of a dummy lens according to an embodiment of the present invention.
FIG. 2B is a schematic view of an optical waveguide lens and a projector according to an embodiment of the present invention.
FIG. 3A~FIG. 3F are schematic views of the corresponding relationship between the first pattern and the first predetermined pattern according to an embodiment of the present invention.

The carrying device 110 is suitable for placing a dummy lens 210 or an optical waveguide lens 220, as shown in FIG. 2A or FIG. 2B. In the embodiment, the dummy lens 210 is provided with a plurality of characteristic points 211, 212, 213 and 214, and the characteristic points 211, 212, 213 and 214 may form a first pattern 215. In FIG. 2, the number of characteristic points is 4, and the first pattern 215 is a rectangle, but the embodiment of the present invention is not limited thereto. In other embodiments, the user may adjust the number of the characteristic points according to the requirements thereof, and these characteristic points may form the first pattern 215 with another shape, which may also achieve the same technical effect.

In some embodiments, the dummy lens 210 may be a lens that imitates an optical waveguide lens, and the optical waveguide lens 220 may be a general optical waveguide lens. The present invention first uses the dummy lens 210 to adjust the alignment device 100, and then uses the adjusted alignment device 100 to connect the optical waveguide lens 220 of an optical waveguide display module to a projector 230.

The sensing device 120 may be disposed relative to the carrying device 110. The sensing device 120 is suitable for sensing the first pattern 215 formed by the characteristic points 211, 212, 213 and 214 of the dummy lens 210 to generate a first sensing result. In addition, the sensing device 120 is suitable for sensing a second pattern generated by a light exit portion 221 of the optical waveguide lens 220 to generate a second sensing result. In some embodiments, the sensing device 120 may include a camera or another suitable image sensor.

The first adjustment device 130 may be connected to the sensing device 120 or the carrying device 110. The first adjustment device 130 may adjust the position of the sensing device 120 to align the dummy lens 210 with the sensing device 120. For example, the dummy lens 210 is perpendicular to the sensing device 120, and the center of the first pattern 215 of the dummy lens 210 is aligned with the center of the sensing device 120.

In some embodiment, since the sensing device 120 is disposed relative to the carrying device 110, the first adjustment device 130 may also be connected to the carrying device 110, and the first adjustment device 130 is used to adjust the position of the carrying device 110 to align the dummy lens 210 and the sensing device 120. The following embodiments are described with the first adjustment device 130 connected to the sensing device 120.

In some embodiments, the first adjustment device 130 may include a bracket 131, a horizontal axis adjustment element 132, a roll axis adjustment element 133, a yaw axis adjustment element 134 and a pitch axis adjustment element 135.

The bracket 131 may be connected to the sensing device 120, i.e., the sensing device 120 may be installed on bracket 131. The horizontal axis adjustment element 132 may adjust (for example, moving forward and backward and moving left and right) the bracket 131 on the X axis and the Y axis, so as to adjust the position of the sensing device 120. The roll axis adjustment element 133 may adjust (for example, rotating around the X axis) the bracket 131 on the X axis, so as to adjust the position of the sensing device 120. The yaw axis adjustment element 134 may adjust (for example, rotating left and right around the Z axis) the bracket 131 on the Z axis, so as to adjust the position of the sensing device 120. The pitch axis adjustment element 135 may adjust (for example, rotating forward and backward around the Y axis) the bracket 131 on the Y axis, so as to adjust the position of the sensing device 120.

The second adjustment device 140 is suitable for mounting the projector 230, as shown in FIG. 2B. The projector 230 may be disposed adjacent to a light entrance portion 222 of the optical waveguide lens 220. In the embodiment, the projector 230 may project the second pattern to the light entrance portion 222 of the optical waveguide lens 220, the second pattern may be transmitted from the light entrance portion 222 to the light exit portion 221 through a transmission portion (not shown), and the second pattern is generated at the light exit portion 221. The above project 230 refers to a projector to be disposed on the light waveguide display module, and the optical waveguide lens 220 refers to an optical waveguide lens to be disposed on the light waveguide display module.

In addition, the second adjustment device 140 may be used to adjust the position of the projector 230 to align the optical waveguide lens 220 with the projector 230. For example, the optical waveguide lens 220 is perpendicular to the projector 230, and the center of the light exit portion 221 of the optical waveguide lens 220 is aligned with the center of the projector 230.

In some embodiments, the second adjustment device 140 may include a bracket 141, a horizontal axis adjustment element 142, a roll axis adjustment element 143, a yaw axis adjustment element 144 and a pitch axis adjustment element 145.

The bracket 141 is suitable for mounting the projector 230, i.e., the projector 230 may be installed on the bracket 141. The horizontal axis adjustment element 142 may adjust (for example, moving forward and backward and moving left and right) the bracket 141 on the X axis and the Y axis, so as to adjust the position of the projector 230. The roll axis adjustment element 143 may adjust (for example, rotating around the X axis) the bracket 141 on the X axis, so as to adjust the position of the projector 230. The yaw axis adjustment element 144 may adjust (for example, rotating left and right around the Z axis) the bracket 141 on the Z axis, so as to adjust the position of the projector 230. The pitch axis adjustment element 145 may adjust (for example, rotating forward and backward around the Y axis) the bracket 141 on the Y axis, so as to adjust the position of the projector 230.

In some embodiments, the alignment device 100 may include a processing device 150. The processing device 150 may be connected to the sensing device 120. The processing device 150 may receive the first sensing result generated by the sensing device 120, and determine whether the first pattern 215 of the first sensing result matches a first predetermined pattern.

For example, the processing device 150 may calculate the difference of center point position between the first pattern 215 of the dummy lens 210 (such as the lens that imitates the optical waveguide lens) and the first predetermined pattern; and the difference of rotation level (such as the roll axis, the yaw axis and the pitch axis) between the first pattern 215 of the dummy lens 210 (such as the lens that imitates the optical waveguide lens) and the first predetermined pattern. Then, the processing device 150 may determine whether the difference of the center point position between the first pattern 215 and the first predetermined pattern is less than a first predetermined value.

When determining that the difference of the center point position between the first pattern 215 and the first predetermined pattern is less than the first predetermined value, the processing device 150 may further determine whether the difference of the rotation level between the first pattern 215 and the first predetermined pattern is less than a second predetermined value. When determining that the difference of the rotation level between the first pattern 215 and the first predetermined pattern is less than the second predetermined value, the processing device 150 may determine that the first pattern 215 matches the first predetermined pattern.

In addition, when determining that the difference of the center point position between the first pattern 215 and the first predetermined pattern is not less than the first predetermined value or determining that the difference of the rotation level between the first pattern 215 and the first predetermine pattern is not less than the second predetermined value, the processing device 150 may determine that the first pattern 215 does not match the first predetermined pattern. In the embodiment, the first predetermined value is, for example, 0.05 millimeter (mm), and the second predetermined value is, for example, 0.1 degree.

As shown in FIG. 3A, when the processing device 150 determines that the first pattern 215 matches the first predetermined pattern 310, the processing device 150 does not generate a first adjustment instruction, and it indicates that the dummy lens 210 is aligned with the sensing device 120.

In FIG. 3A, the first pattern 215 completely overlaps the first predetermined pattern 310, but the embodiment of the present invention is not limited thereto. In other embodiments, if the first pattern 215 is a proportionally reduced or enlarged pattern of the first predetermined pattern 310, the processing device 150 may also determine that the first pattern 215 matches the first predetermined pattern 310.

As shown in FIG. 3B, FIG. 3C, FIG. 3D, FIG. 3E or FIG. 3F, when the processing device 150 determines that the first pattern 215 does not match the first predetermined pattern 310, the processing device 150 may generate the first adjustment instruction, and it indicates that the dummy lens 210 is not aligned with the sensing device 120. Then, in some embodiments, the user may operate the first adjustment device 130 to adjust the position of the sensing device 120 or the carrying device 110 according to the first adjustment instruction, so as to align the dummy lens 210 with the sensing device 120.

For example, when the first adjustment instruction generated by the processing device 150 is FIG. 3B, it indicates that the sensing device 120 has a shifting on the roll axis, for example, the difference of the rotation level on the roll axis is not less than the second predetermined value. Accordingly, the user may operate the roll axis adjustment element 133 of the first adjustment device 130 to adjust the position of the sensing device 120 or the carrying device 110. Then, the processing device 150 may determine again whether the first pattern 215 matches the first predetermined pattern 310 until the processing device 150 determines that the first pattern 215 matches the first predetermined pattern 310, and it indicates that the dummy lens 210 is already aligned with the sensing device 120.

When the first adjustment instruction generated by the processing device 150 is FIG. 3C, it indicates that the sensing device 120 has a shifting on the yaw axis, for example, the difference of the rotation level on the yaw axis is not less than the second predetermined value. Accordingly, the user may operate the yaw axis adjustment element 134 of the first adjustment device 130 to adjust the position of the sensing device 120 or the carrying device 110. Then, the processing device 150 may determine again whether the first pattern 215 matches the first predetermined pattern 310 until the processing device 150 determines that the first pattern 215 matches the first predetermined pattern 310, and it indicates that the dummy lens 210 is already aligned with the sensing device 120.

When the first adjustment instruction generated by the processing device 150 is FIG. 3D, it indicates that the sensing device 120 has a shifting on the pitch axis, for example, the difference of the rotation level on the pitch axis is not less than the second predetermined value. Accordingly, the user may operate the pitch axis adjustment element 135 of the first adjustment device 130 to adjust the position of the sensing device 120 or the carrying device 110. Then, the processing device 150 may determine again whether the first pattern 215 matches the first predetermined pattern 310 until the processing device 150 determines that the first pattern 215 matches the first predetermined pattern 310, and it indicates that the dummy lens 210 is already aligned with the sensing device 120.

When the first adjustment instruction generated by the processing device 150 is FIG. 3E, it indicates that the sensing device 120 has a shifting on the X axis of the horizontal axis, for example, the difference of the center point position on the X axis is not less than the first predetermined value. Accordingly, the user may operate the horizontal axis adjustment element 132 of the first adjustment device 130 to adjust the position of the sensing device 120 or the carrying device 110. Then, the processing device 150 may determine again whether the first pattern 215 matches the first predetermined pattern 310 until the processing device 150 determines that the first pattern 215 matches the first predetermined pattern 310, and it indicates that the dummy lens 210 is already aligned with the sensing device 120.

When the first adjustment instruction generated by the processing device 150 is FIG. 3F, it indicates that the sensing device 120 has a shifting on the Y axis of the horizontal axis, for example, the difference of the center point position on the Y axis is not less than the first predetermined value. Accordingly, the user may operate the horizontal axis adjustment element 132 of the first adjustment device 130 to adjust the position of the sensing device 120 or the carrying device 110. Then, the processing device 150 may determine again whether the first pattern 215 matches the first predetermined pattern 310 until the processing device 150 determines that the first pattern 215 matches the first predetermined pattern 310, and it indicates that the dummy lens 210 is already aligned with the sensing device 120.

In addition, in some embodiments, the first adjustment device 130 may be further connected to the processing device 150, and the processing device 150 may generate a control signal to control the first adjustment device 130 according to the first adjustment instruction, so as to adjust the position of the sensing device 120 or the carrying device 110 to align the dummy lens 210 with the sensing device 120.

For example, when the first adjustment instruction generated by the processing device 150 is FIG. 3B, the processing device 150 may generate the corresponding control signal to control the roll axis adjustment element 133 of the first adjustment device 130 (and the adjustment elements relative to FIG. 3C~FIG. 3F) according to the first adjustment instruction corresponding to FIG. 3B (and FIG. 3C~FIG. 3F), so as to adjust the position of the sensing device 120 or the carrying device 110. Then, the processing device 150 may determine again whether the first pattern 215 matches the first predetermined pattern 310 until the processing device 150 determines that the first pattern 215 matches the first predetermined pattern 310, and it indicates that the dummy lens 210 is already aligned with the sensing device 120.

When the dummy lens 210 is already aligned with the sensing device 120, the dummy lens 210 is removed and replaced with the optical waveguide lens 220. Then, the processing device 150 may receive the second sensing result, and determine whether the second pattern of the second sensing result matches the second predetermined pattern. For example, the processing device 150 may calculate the difference of rotation level (such as the roll axis, the yaw axis and the pitch axis) between the second pattern and the second predetermined pattern; and overlapping level between the second pattern and the second predetermined pattern. Then, the processing device 150 may determine whether the difference of the rotation level between the second pattern and the second predetermined pattern is less than a third predetermined value.

When determining that the difference of rotation level between the second pattern and the second predetermined pattern is less than the third predetermined value, the processing device 150 determines whether the overlapping level between the second pattern and the second predetermined pattern is a complete overlap. When determining that the overlapping level between the second pattern and the second predetermined pattern is the complete overlap, the processing device 150 may determine that the second pattern matches the second predetermined pattern.

In addition, when determining that the difference of the rotation level between the second pattern and the second predetermined pattern is not less than the third predetermined value or determining that the overlapping level between the second pattern and the second predetermined pattern is not the complete overlap, the processing device 150 may determine that the second pattern does not match the second predetermined pattern. In the embodiment, the third predetermined value is, for example, 0.05 mm.

As shown in FIG. 4A, when the processing device 150 determines that the second pattern 411 of the optical waveguide lens 220 (such as the general optical waveguide lens) matches the second predetermined pattern 412, the processing device 150 does not generate a second adjustment instruction, and it indicates that the optical waveguide lens 220 is aligned with the projector 230. Furthermore, when the second pattern 411 completely overlaps with the second predetermined pattern 412, the processing device 150 may determine that the second pattern 411 matches the second predetermined pattern 412. In addition, in FIG. 4A~FIG. 4F, the second pattern 411 is a crosshair pattern, but the embodiment of the present invention is not limited thereto. In other embodiments, the second pattern 412 may be another pattern, such as an all-white pattern as shown in FIG. 4G or a white square pattern on a black background as shown in FIG. 4H.

As shown in FIG. 4B, FIG. 4C, FIG. 4D, FIG. 4E or FIG. 4F, when the processing device 150 determines that the second pattern 411 does not match the second predetermined pattern 412, the processing device 150 may generate the second adjustment instruction, and it indicates that the optical waveguide lens 220 is not aligned with the projector 230. Then, in some embodiments, the user may operate the second adjustment device 140 to adjust the position of the projector 230 according to the second adjustment instruction, so as to align the optical waveguide lens 220 with the projector 230.

For example, when the second adjustment instruction generated by the processing device 150 is FIG. 4B, it indicates that the projector 230 has a shifting on the roll axis, for example, the difference of the rotation level on the roll axis is not less than the third predetermined value. Accordingly, the user may operate the roll axis adjustment element 143 of the second adjustment device 140 to adjust the position of the projector 230. Then, the processing device 150 may determine again whether the second pattern 411 matches the second predetermined pattern 412 until the processing device 150 determines that the second pattern 411 matches the second predetermined pattern 412, and it indicates that the optical waveguide lens 220 is already aligned with the projector 230.

When the second adjustment instruction generated by the processing device 150 is FIG. 4C, it indicates that the projector 230 has a shifting on the yaw axis, for example, the difference of the rotation level on the yaw axis is not less than the third predetermined value. Accordingly, the user may operate the yaw axis adjustment element 144 of the second adjustment device 140 to adjust the position of the projector 230. Then, the processing device 150 may determine again whether the second pattern 411 matches the second predetermined pattern 412 until the processing device 150 determines that the second pattern 411 matches the second predetermined pattern 412, and it indicates that the optical waveguide lens 220 is already aligned with the projector 230.

When the second adjustment instruction generated by the processing device 150 is FIG. 4D, it indicates that the projector 230 has a shifting on the pitch axis, for example, the difference of the rotation level on the pitch axis is not less than the third predetermined value. Accordingly, the user may operate the pitch axis adjustment element 145 of the second adjustment device 140 to adjust the position of the projector 230. Then, the processing device 150 may determine again whether the second pattern 411 matches the second predetermined pattern 412 until the processing device 150 determines that the second pattern 411 matches the second predetermined pattern 412, and it indicates that the optical waveguide lens 220 is already aligned with the projector 230.

When the second adjustment instruction generated by the processing device 150 is FIG. 4E, it indicates that the projector 230 has a shifting on the X axis of the horizontal axis, for example, the overlapping level on the X axis is not the complete overlap. Accordingly, the user may operate the horizontal axis adjustment element 142 of the second adjustment device 140 to adjust the position of the projector 230. Then, the processing device 150 may determine again whether the second pattern 411 matches the second predetermined pattern 412 until the processing device 150 determines that the second pattern 411 matches the second predetermined pattern 412, and it indicates that the optical waveguide lens 220 is already aligned with the projector 230.

When the second adjustment instruction generated by the processing device 150 is FIG. 4F, it indicates that the projector 230 has a shifting on the Y axis of the horizontal axis, for example, the overlapping level on the Y axis is not the complete overlap. Accordingly, the user may operate the horizontal axis adjustment element 142 of the second adjustment device 140 to adjust the position of the projector 230. Then, the processing device 150 may determine again whether the second pattern 411 matches the second predetermined pattern 412 until the processing device 150 determines that the second pattern 411 matches the second predetermined pattern 412, and it indicates that the optical waveguide lens 220 is already aligned with the projector 230.

In addition, in some embodiments, the second adjustment device 140 may be further connected to the processing device 150, and the processing device 150 may generate a control signal to control the second adjustment device 140 according to the second adjustment instruction, so as to adjust the position of the projector 230 to align the optical waveguide lens 220 with the projector 230.

For example, when the second adjustment instruction generated by the processing device 150 is FIG. 4B, the processing device 150 may generate the corresponding control signal to control the roll axis adjustment element 143 of the second adjustment device 140 (and the adjustment elements relative to FIG. 4C~FIG. 4F) according to the second adjustment instruction corresponding to FIG. 4B (and FIG. 4C~FIG. 4F), so as to adjust the position of the projector 230. Then, the processing device 150 may determine again whether the second pattern 411 matches the second predetermined pattern 412 until the processing device 150 determines that the second pattern 411 matches the second predetermined pattern 412, and it indicates that the optical waveguide lens 220 already aligned with the projector 230.

In some embodiments, the position of the first pattern 215 corresponds to the position of the light exit portion 221.

In some embodiments, a connecting element or bonding element 240 is provided around the light entrance portion 222 of the optical waveguide lens 220 (the general optical waveguide lens). The connecting element 240 may be suitable for connecting the optical waveguide lens 220 to the projector 230 when the optical waveguide lens 220 is aligned with the projector 230, so as to complete the assembly of the optical waveguide lens 220 and the projector 230.

In some embodiments, the connecting element 240 may include an optical glue, such as an ultraviolet rays glue (UV glue). That is, the connecting element 240 (the optical glue) may be disposed around the light entrance portion 222 of the optical waveguide lens 220. Then, when the optical waveguide lens 220 is aligned with the projector 230, the connecting element 240 (the optical glue) is irradiated with light (such as the ultraviolet rays) to solidify the connecting element 240 (the optical glue), so as to connect the optical waveguide lens 220 to the projector 230.

In some embodiments, the connecting element 240 may include a plastic part and an optical glue. The plastic part may be disposed around the light entrance portion 222 of the optical waveguide lens 220, and the optical glue is disposed on the plastic part. Then, when the optical waveguide lens 220 is aligned with the projector 230, the optical glue is irradiated with light (such as the ultraviolet rays) to solidify the optical glue), so as to connect the optical waveguide lens 220 to the projector 230.

FIG. 5 is a flowchart of an operation method of an alignment device according to an embodiment of the present invention. In step S502, the method involves placing a dummy lens on a carrying device of the alignment device, wherein the dummy lens is provided with a plurality of characteristic points, and the characteristic points form a first pattern.

In step S504, the method involves using a sensing device of the alignment device to sense the first pattern to generate a first sensing result. In step S506, the method involves using a first adjustment device of the alignment device to adjust the position of the sensing device or the carrying device to align the dummy lens with the sensing device.

In step S508, the method involves replacing the dummy lens with an optical waveguide lens, and placing the optical waveguide lens on the carrying device. The optical waveguide lens is, for example, a general optical waveguide lens, i.e., the optical waveguide lens installed in a product of the light waveguide display module. In step S510, the method involves mounting a projector on a second adjustment device of the alignment device, wherein the projector is disposed adjacent to a light entrance portion of the optical waveguide lens. In step S512, the method involves using the sensing device to sense a second pattern generated by the light exit portion of the optical waveguide lens to generate a second sensing result.

In step S514, the method involves using the second adjustment device to adjust the projector to align the optical waveguide lens with the projector. In step S516, the method involves arranging a connecting element around the light entrance portion of the optical waveguide lens. In step S518, the method involves connecting the optical waveguide lens to the projector through the connecting element when the optical waveguide lens is aligned with the projector.

In some embodiments, the position of the first pattern corresponds to the position of the light exit portion. In some embodiments, each of the first adjustment device and the second adjustment device may include a bracket, a horizontal axis adjustment element, a roll axis adjustment element, a yaw axis adjustment element and a pitch axis adjustment element.

FIG. 6 is a flowchart of an operation method of an alignment device according to another embodiment of the present invention. In the embodiment, steps S502~S514 in FIG. 6 are the same as or similar to steps S502~S514 in FIG. 5. Accordingly, steps S502~514 in FIG. 6 may refer to the description of the embodiment of FIG. 5, and the description thereof is not repeated herein.

In step S602, the method involves using a processing device of the alignment device to receive the first sensing result. In step S604, the method involves using the processing device to determine whether the first pattern of the first sensing result matches the first predetermined pattern. When determining that the first pattern matches the first predetermined pattern, the method performs step S606. In step S606, the method involves the processing device not generating a first adjustment instruction. Then, the method performs step S508.

When determining that the first pattern does not match the first predetermined pattern, the method performs step S608. In step S608, the method involves the processing device generating the first adjustment instruction. Then, the method performs steps S506 and S604. In addition, step S506 may further include using the processing device to generate a control signal to control the first adjustment device according to the first adjustment instruction, so as to adjust the position of the sensing device or the carrying deice to align the dummy lens with the sensing device.

In step S610, the method involves using the processing device to receive the second sensing result. In step S612, the method involves using the processing device to determine whether the second pattern of the second sensing result matches the second predetermined pattern. When determining that the second pattern matches the second predetermined pattern, the method performs step S614. In step S614, the method involves the processing device not generating the second adjustment instruction. Then, the method performs step S516.

When determining that the second pattern does not match the second predetermined pattern, the method performs step S616. In step S616, the method involves the processing device generating the second adjustment instruction. Then, the method performs steps S514 and S612. In addition, step S514 may further include using the processing device to generate a control signal to control the second adjustment device according to the second adjustment instruction, so as to adjust the position of the projector to align the optical waveguide lens and the projector.

Figure 7:
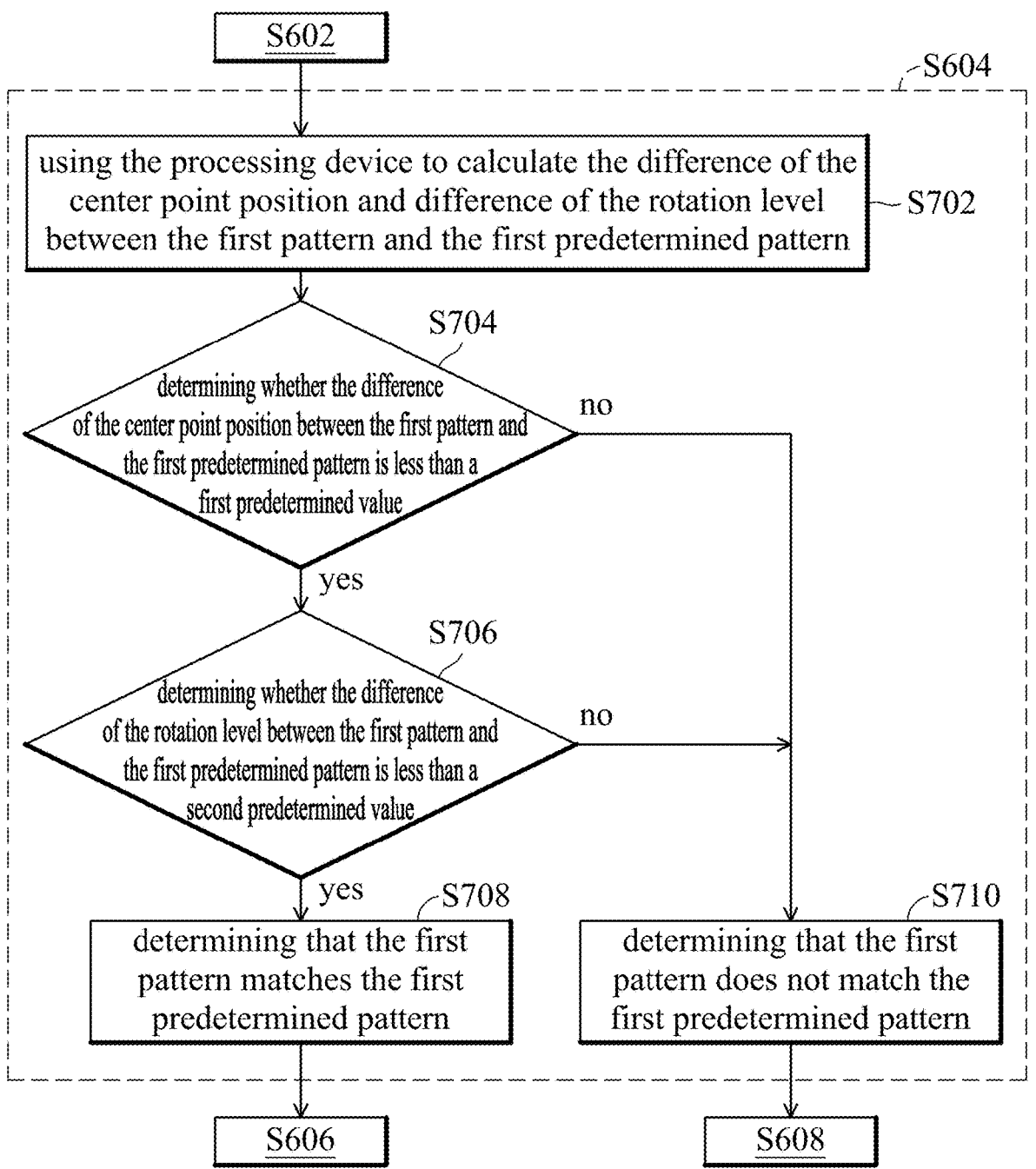
FIG. 7 is a detailed flowchart of step S604 in FIG. 6.

FIG. 7 is a detailed flowchart of step S604 in FIG. 6. In step S702, the method involves using the processing device to calculate the difference of the center point position and difference of the rotation level between the first pattern and the first predetermined pattern.

In step S704, the method involves determining whether the difference of the center point position between the first pattern and the first predetermined pattern is less than a first predetermined value. When determining that the difference of the center point position between the first pattern and the first predetermined pattern is less than the first predetermined value, the method performs step S706. In step S706, the method involves determining whether the difference of the rotation level between the first pattern and the first predetermined pattern is less than a second predetermined value.

When determining that the difference of the rotation level between the first pattern and the first predetermined pattern is less than the second predetermined value, the method performs step S708. In step S708, the method involves determining that the first pattern matches the first predetermined pattern. When determining that the difference of the center point position between the first pattern and the first predetermined pattern is not less than the first predetermined value, the method performs step S710. In step S710, the method involves determining that the first pattern does not match the first predetermined pattern. When determining that the difference of the rotation level between the first pattern and the first predetermined pattern is not less than the second predetermined value, the method performs step S710. In step S710, the method involves determining that the first pattern does not match the first predetermined pattern.

Figure 8:
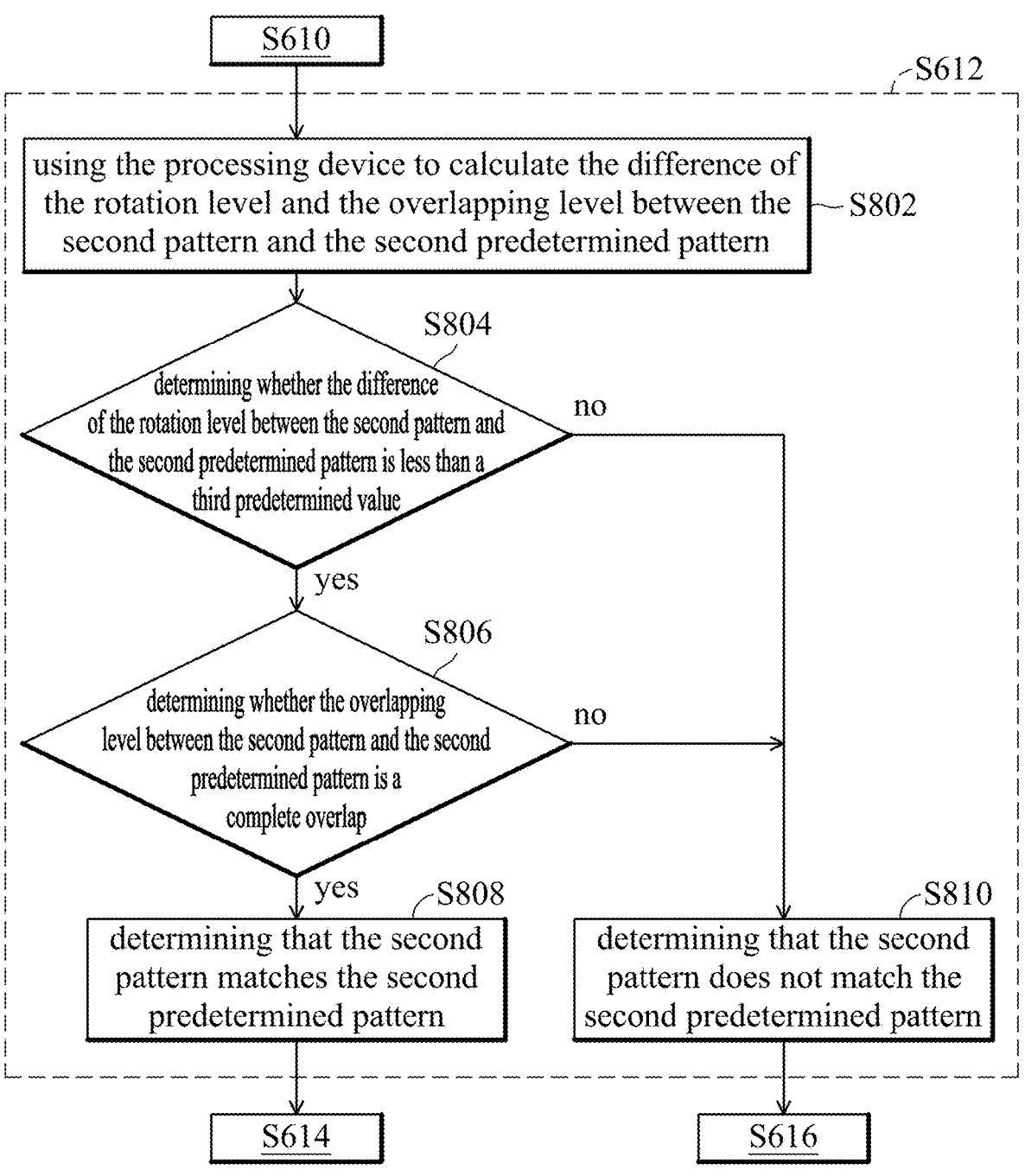
FIG. 8 is a detailed flowchart of step S612 in FIG. 6.

FIG. 8 is a detailed flowchart of step S612 in FIG. 6. In step S802, the method involves using the processing device to calculate the difference of the rotation level and the overlapping level between the second pattern and the second predetermined pattern.

In step S804, the method involves determining whether the difference of the rotation level between the second pattern and the second predetermined pattern is less than a third predetermined value. When determining that the difference of the rotation level between the second pattern and the second predetermined pattern is less than a third predetermined value, the method performs step S806. In step S806, the method involves determining whether the overlapping level between the second pattern and the second predetermined pattern is a complete overlap.

When determining that the overlapping level between the second pattern and the second predetermined pattern is the complete overlap, the method performs step S808. In step S808, the method involves determining that the second pattern matches the second predetermined pattern. When determining that the difference of the rotation level between the second pattern and the second predetermined pattern is not less than the third predetermined value, the method performs step S810. In step S810, the method involves determining that the second pattern does not match the second predetermined pattern. When determining that the overlapping level between the second pattern and the second predetermined pattern is not the complete overlap, the method performs step S810. In step S810, the method involves determining that the second pattern does not match the second predetermined pattern.

It should be noted that the order of the steps of FIG. 5, FIG. 6, FIG. 7 and FIG. 8 is only for illustrative purposes, and is not intended to limit the order of the steps of the present invention. The user may change the order of the steps above to meet specific requirements. The flowcharts described above may add additional steps or use fewer steps without departing from the spirit and scope of the present invention.

In summary, according to the alignment device disclosed by the embodiment of the present invention, the sensing device senses the first pattern of the dummy lens placed on the carrying device to generate the first sensing result, wherein the dummy lens is provided with a plurality of characteristic points, and the characteristic points form the first pattern. The sensing device senses the second pattern generated by the light exit portion of the optical waveguide lens placed on the carrying device to generate the second sensing result. The first adjustment device adjusts the position of the sensing device or the carrying device to align the dummy lens with the sensing device. The second adjustment device adjusts the position of the projector to align the optical waveguide lens with the projector, wherein the projector is disposed adjacent to the light entrance portion of the optical waveguide lens. Therefore, it may effectively ensure the accuracy of the alignment of the optical waveguide lens and the projector, so as to increase the image quality and the user experience.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An alignment device, comprising:
a carrying device, suitable for placing one of a dummy lens and an optical waveguide lens, wherein the dummy lens is provided with a plurality of characteristic points, and the plurality of characteristic points form a first pattern;
a sensing device, disposed relative to the carrying device, wherein the sensing device is suitable for sensing the first pattern to generate a first sensing result, and the sensing device is suitable for sensing a second pattern generated by a light exit portion of the optical waveguide lens to generate a second sensing result;
a first adjustment device, configured to adjust a position of the sensing device or the carrying device to align the dummy lens with the sensing device according to the first sensing result; and
a second adjustment device, suitable for mounting a projector, wherein the projector is disposed adjacent to a light entrance portion of the optical waveguide lens, and the second adjustment device is configured to adjust a position of the projector to align the optical waveguide lens with the projector according to the second sensing result.

2. The alignment device as claimed in claim 1, further comprising:
a processing device, connected to the sensing device;
wherein the processing device is configured to receive the first sensing result, and determine whether the first pattern of the first sensing result matches a first predetermined pattern;
when the processing device determines that the first pattern matches the first predetermined pattern, the processing device does not generate a first adjustment instruction;
when the processing device determines that the first pattern does not match the first predetermined pattern, the processing device generates the first adjustment instruction.

3. The alignment device as claimed in claim 2, wherein the first adjustment device is further connected to the processing device, and the processing device generates a control signal to control the first adjustment device according to the first adjustment instruction, so as to adjust the position of the sensing device or the carrying device to align the dummy lens with the sensing device.

4. The alignment device as claimed in claim 2, wherein the processing device is further configured to receive the second sensing result, and determine whether the second pattern of the second sensing result matches a second predetermined pattern;

when the processing device determines that the second pattern matches the second predetermined pattern, the processing device does not generate a second adjustment instruction;

when the processing device determines that the second pattern does not match the second predetermined pattern, the processing device generates the second adjustment instruction.

5. The alignment device as claimed in claim 4, wherein the second adjustment device is further connected to the processing device, and the processing device generates a control signal to control the second adjustment device according to the second adjustment instruction, so as to adjust the position of the projector to align the optical waveguide lens with the projector.

6. The alignment device as claimed in claim 1, wherein the position of the first pattern corresponds to the position of the light exit portion.

7. The alignment device as claimed in claim 1, wherein the first pattern is a rectangle.

8. The alignment device as claimed in claim 1, wherein each of the first adjustment device and the second adjustment device comprises a bracket, a horizontal axis adjustment element, a roll axis adjustment element, a yaw axis adjustment element and a pitch axis adjustment element.

9. The alignment device as claimed in claim 1, wherein a connecting element is provided around the light entrance portion of the optical waveguide lens, and the connecting element is suitable for connecting the optical waveguide lens to the projector when the optical waveguide lens is aligned with the projector.

10. The alignment device as claimed in claim 9, wherein the connecting element at least comprises an optical glue.

* * * * *